(12) United States Patent
Seiji

(10) Patent No.: US 8,919,487 B2
(45) Date of Patent: Dec. 30, 2014

(54) FUEL TANK SUPPORT STRUCTURE FOR A SADDLE-TYPE VEHICLE, AND BODY FRAME INCORPORATING THE FUEL TANK SUPPORT STRUCTURE

(75) Inventor: Tatsuya Seiji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 4 days.

(21) Appl. No.: 13/349,805

(22) Filed: Jan. 13, 2012

(65) Prior Publication Data

US 2012/0181101 A1    Jul. 19, 2012

(30) Foreign Application Priority Data

Jan. 17, 2011   (JP) .................................. 2011-007336

(51) Int. Cl.
*B62K 11/02* (2006.01)
*B62J 35/00* (2006.01)
*B62K 11/10* (2006.01)

(52) U.S. Cl.
CPC ................. *B62K 11/10* (2013.01); *B62J 35/00* (2013.01); *B62K 2202/00* (2013.01)
USPC .......................................... 180/311; 180/225

(58) Field of Classification Search
USPC .......................................... 180/311, 219, 225
See application file for complete search history.

(56) References Cited

U.S. PATENT DOCUMENTS

| | | | | |
|---|---|---|---|---|
| 4,721,178 A | * | 1/1988 | Ito ................................. | 180/215 |
| 5,284,221 A | * | 2/1994 | Warne ........................... | 180/219 |
| 5,921,339 A | * | 7/1999 | Matsuura ...................... | 180/219 |
| 6,073,719 A | * | 6/2000 | Ohmika et al. ................ | 180/219 |
| 6,318,743 B1 | * | 11/2001 | Nakashima et al. ........ | 280/152.1 |
| 6,644,693 B2 | * | 11/2003 | Michisaka et al. ............ | 280/835 |
| 8,118,127 B2 | * | 2/2012 | Miyabe .......................... | 180/219 |
| 8,297,395 B2 | * | 10/2012 | Yamada et al. ................ | 180/219 |
| 8,342,282 B2 | * | 1/2013 | Kuramochi et al. .......... | 180/219 |
| 2001/0028168 A1 | * | 10/2001 | Nakagawa ..................... | 280/830 |
| 2007/0012500 A1 | * | 1/2007 | Brown et al. .................. | 180/219 |

FOREIGN PATENT DOCUMENTS

| | | | | | |
|---|---|---|---|---|---|
| JP | 03104791 | A | * | 5/1991 | ............... B62J 35/00 |
| JP | 03136985 | A | * | 6/1991 | ............... B62J 17/00 |
| JP | 03193582 | A | * | 8/1991 | ............... B62J 35/00 |
| JP | 2002-331979 | A | | 11/2002 | |

* cited by examiner

*Primary Examiner* — Nicole Verley

(74) *Attorney, Agent, or Firm* — Carrier Blackman & Associates, P.C.; William D. Blackman; Anne G. Sabourin

(57) ABSTRACT

A fuel tank support structure for a saddle-type vehicle includes a head pipe which steerably supports a front wheel, a main frame section extending rearwardly and downwardly from the head pipe, and a pair of left and right lower frame sections extending substantially horizontally rearwardly from a lower portion of the main frame section. A fuel tank is disposed in back of the main frame section and between the lower frame sections, and a step floor is disposed over the fuel tank. In the fuel tank support structure, floor support members are disposed under the step floor as support members. The floor support members are disposed in a left-right pair on the outer sides relative to the lower frame sections. The fuel tank is supported by the floor support members. The lower frame sections are disposed so that their lower edges extend along a lower surface of the fuel tank.

10 Claims, 9 Drawing Sheets

US 8,919,487 B2

FUEL TANK SUPPORT STRUCTURE FOR A SADDLE-TYPE VEHICLE, AND BODY FRAME INCORPORATING THE FUEL TANK SUPPORT STRUCTURE

CROSS-REFERENCE TO RELATED APPLICATIONS

The present invention claims priority under 35 USC 119 based on Japanese patent application No. 2011-007336, filed on Jan. 17, 2011. The entire subject matter of this priority document, including specification claims and drawings thereof, is incorporated by reference herein.

BACKGROUND OF THE INVENTION

1. Field of the Invention

The present invention relates to a fuel tank support structure for a saddle type vehicle, and to a body frame incorporating the novel fuel tank support structure. More particularly, the present invention relates to a fuel tank support structure which is formed, in part, by a portion of a body frame assembly, and to a body frame incorporating same.

2. Description of the Background Art

In relation to saddle type vehicles, there has been known a fuel tank support structure in which a main frame section extending rearwardly downward from a head pipe, and a pair of left and right lower frame sections extending substantially horizontally rearward from a lower portion of the main frame section are provided, a fuel tank is disposed between the pair of left and right lower frame sections, and the fuel tank is fixed to the lower frame sections (see, for example, Japanese Patent Laid-open No. 2002-331979).

Meanwhile, in order to secure the capacity of a fuel tank, it is desirable to extend the fuel tank in the left-right direction (vehicle width direction). In the above-mentioned saddle type vehicle in the related art, however, the lower frame sections are located on the left and right sides of the fuel tank. This makes it difficult to dispose the fuel tank so as to project to the outer sides relative to the width between the left and right lower frame sections.

The present invention has been made in consideration of the above-mentioned circumstances. Accordingly, it is an object of the present invention to ensure that, in a fuel tank support structure for a saddle type vehicle, the capacity of a fuel tank can be enlarged by extending the fuel tank in the left-right direction.

SUMMARY OF THE INVENTION

In order to attain the above object, according to the present invention, there is provided a fuel tank support structure for a saddle type vehicle. The reference numbers, in parentheses, in the following description correspond to reference numbers in the drawings.

In a selected illustrative embodiment of the invention, a fuel tank support structure includes a head pipe (12) which steerably supports a steering system including a front wheel (14), a main frame section (30) extending rearwardly downward from the head pipe (12), a pair of left and right lower frame sections (32, 32) extending substantially horizontally rearward from a lower portion of the main frame section (30), a fuel tank (24) disposed rearwardly of the main frame section (30) and between the pair of left and right lower frame sections (32, 32), and a floor (47) on which to place a driver's feet and which is disposed over the fuel tank (24), characterized in that floor support members (37, 37) disposed beneath the floor (47) to support the floor (47) are provided, the floor support members (37, 37) are disposed in a left-right pair on the outer sides relative to the lower frame sections (32, 32), the fuel tank (24) is supported by the floor support members (37, 37), and the lower frame sections (32, 32) are so disposed that their lower edges (32B) extend along a lower surface (78A) of the fuel tank (24) in side view.

According to this configuration, the fuel tank is disposed between the pair of left and right lower frame sections, and the floor support members disposed beneath the floor are disposed in a left-right pair on the outer sides relative to the lower frame sections. In addition, the fuel tank is supported by the floor support members, and the lower frame sections are so disposed that their lower edges extend along the lower surface of the fuel tank. Therefore, the fuel tank can be extended in the left-right direction toward the sides of the floor support members on the outer sides relative to the lower frame sections and can be extended to the level of the lower edges of the lower frame sections. Accordingly, the capacity of the fuel tank can be enlarged. In addition, the lower surface of the fuel tank can be guarded by the lower edges of the lower frame sections, and it is unnecessary to reinforce the lower surface of the fuel tank. Thus, the fuel tank can be simplified in shape.

In addition, in the above configuration, tank stays (66) may be extended downward from the floor support members (37, 37), the fuel tank (24) may be supported by the tank stays (66), and upper edges (37E) of the floor support members (37, 37) may be located above a fuel pump (70) attached to an upper surface of the fuel tank (24) in side view.

In this case, since the upper edges of the floor support members are located above the fuel pump attached to the upper surface of the fuel tank, the distance between the floor panel support member and the floor is easy to maintain.

In addition, a cross member (79) may extend between the left and right floor support members (37, 37) on the upper side of the fuel pump (70).

In this case, the distance between the fuel pump and the floor is easy to maintain by the cross member extending between the left and right floor support members on the upper side of the fuel pump.

Further, the fuel tank (24) may be provided with a fuel pump (70), and the lower frame sections (32, 32) may be bent in a downwardly projecting shape such that their lower edges (32B) have lowest points (32A) at a position in the vicinity of the fuel pump (70) in side view.

In this case, since the lower frame sections are bent in the downwardly projecting shape such that their lowest points are located in the vicinity of the fuel pump in side view, the fuel pump can be guarded by the lower frame sections. As a result, the fuel pump can be simplified in structure.

In addition, a configuration may be adopted in which rear frame sections (33, 33) extending rearwardly upward from rear end portions of the lower frame sections (32, 32) are provided, and the floor support members (37, 37) are supported at their front end portions (37A) by the main frame section (30) and at their rear end portions (37D) by the rear frame sections (33, 33).

In this case, the floor support members are supported at their front end portions by the main frame section and at their rear end portions by the rear frame sections extending rearwardly upward from the rear end portions of the lower frame sections, and, therefore, the floor support members can be supported utilizing the rear frame sections.

In addition, the rear end portions (37D) of the floor support members (37, 37) may be supported by pillion step brackets (38, 38) provided to project toward the vehicle-width-directionally outer sides from the rear frame sections (33, 33).

In this case, since the rear end portions of the floor support members are supported by the pillion step brackets provided to project toward the vehicle-width-directionally outer sides from the rear frame sections, the floor support members are easy to dispose on the vehicle-width-directionally outer sides. Accordingly, the capacity of the fuel tank can be enlarged with a simple structure.

Effect of the Invention

In the fuel tank support structure for a saddle type vehicle according to the present invention, the fuel tank is disposed between the pair of left and right lower frame sections, and the floor support members disposed beneath the floor are disposed in a left-right pair on the outer sides relative to the lower frame sections. In addition, the fuel tank is supported by the floor support members, and the lower frame sections are so disposed that their lower edges extend along the lower surface of the fuel tank. Therefore, the fuel tank can be extended in the left-right direction toward the sides of the floor support members on the outer sides relative to the lower frame sections and can be extended to the level of the lower edges of the lower frame sections. Accordingly, the capacity of the fuel tank can be enlarged. In addition, the lower surface of the fuel tank can be guarded by the lower edges of the lower frame sections, and it is unnecessary to reinforce the lower surface of the fuel tank. Consequently, the fuel tank can be simplified in shape.

In addition, a favorable distance can be secured between the floor support members and the floor.

In addition, a favorable distance can be secured between the fuel pump and the floor by the cross member extending between the left and right floor support members on the upper side of the fuel pump.

Further, since the fuel pump can be guarded by the lowest points of the lower frame sections, the fuel pump can be simplified in structure.

In addition, the floor panel support member can be supported utilizing the rear frame sections.

In addition, since the rear end portions of the floor support members are supported by the pillion step brackets which are provided to project toward the vehicle-width-directionally outer sides from the rear frame sections, it is possible to easily dispose the floor support members on the vehicle-width-directionally outer sides and thereby to enlarge the capacity of the fuel tank with a simple structure.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
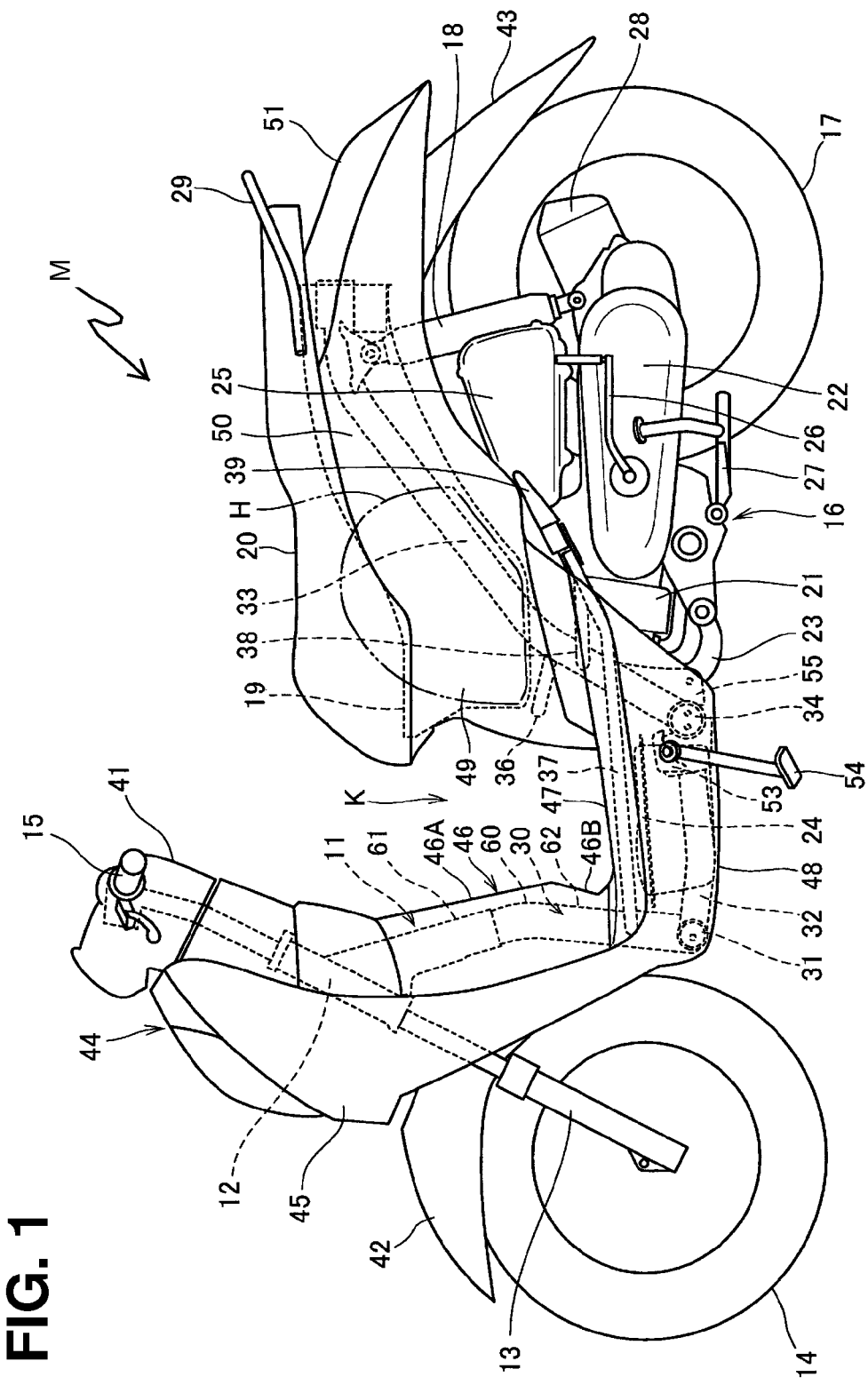
FIG. 1 is a left side plan view of a motorcycle according to the present invention.

Descriptions will be provided below of selected illustrative embodiments of the present invention on a basis of examples of the present invention, supported by and shown in the accompanying drawings. It should be understood that only structures considered necessary for clarifying the present invention are described herein. Other conventional structures, and those of ancillary and auxiliary components of the system, will be known and understood by those skilled in the art. In the following detailed description, relative positional terms such as "front side", "right side" and "left side" correspond to those directions considered from the vantage point of a vehicle operator, seated in the driver's seat and facing forwardly.

Now, a motorcycle according to an embodiment of the present invention will be described below referring to the drawings. Incidentally, in the following description, the upper and lower, forward and rearward, and leftward and rightward directions indicate the respective directions as viewed from point of view of the driver on the vehicle.

FIG. 1 is a left side plan view of a motorcycle according to the present invention. The motorcycle M (saddle type vehicle) is a motor scooter type, saddle type vehicle which includes a vehicle body frame 11; a front fork 13 having a pair of left and right parts and mounted to a head pipe 12 at a front portion of the body frame 11; and a front wheel 14 mounted on the lower ends of the front fork 13. The motorcycle M also includes a handlebar 15 attached to an upper portion of the front fork 13; a power unit 16 swingably mounted to a back-and-forth-directionally intermediate portion of the body frame 11; and a rear wheel 17 mounted to a rear portion of the power unit 16. The motorcycle M also includes a rear shock absorber 18 extending between a rear end portion of the power unit 16 and a rear portion of the body frame 11; a luggage box 19 mounted to a rear portion of the body frame 11; and a seat 20 which is disposed over the luggage box 19 and on which a driver is to be seated. The motorcycle M also includes a fuel tank 24, and a resin-made body cover 44 covering the body frame 11.

Figure 2:
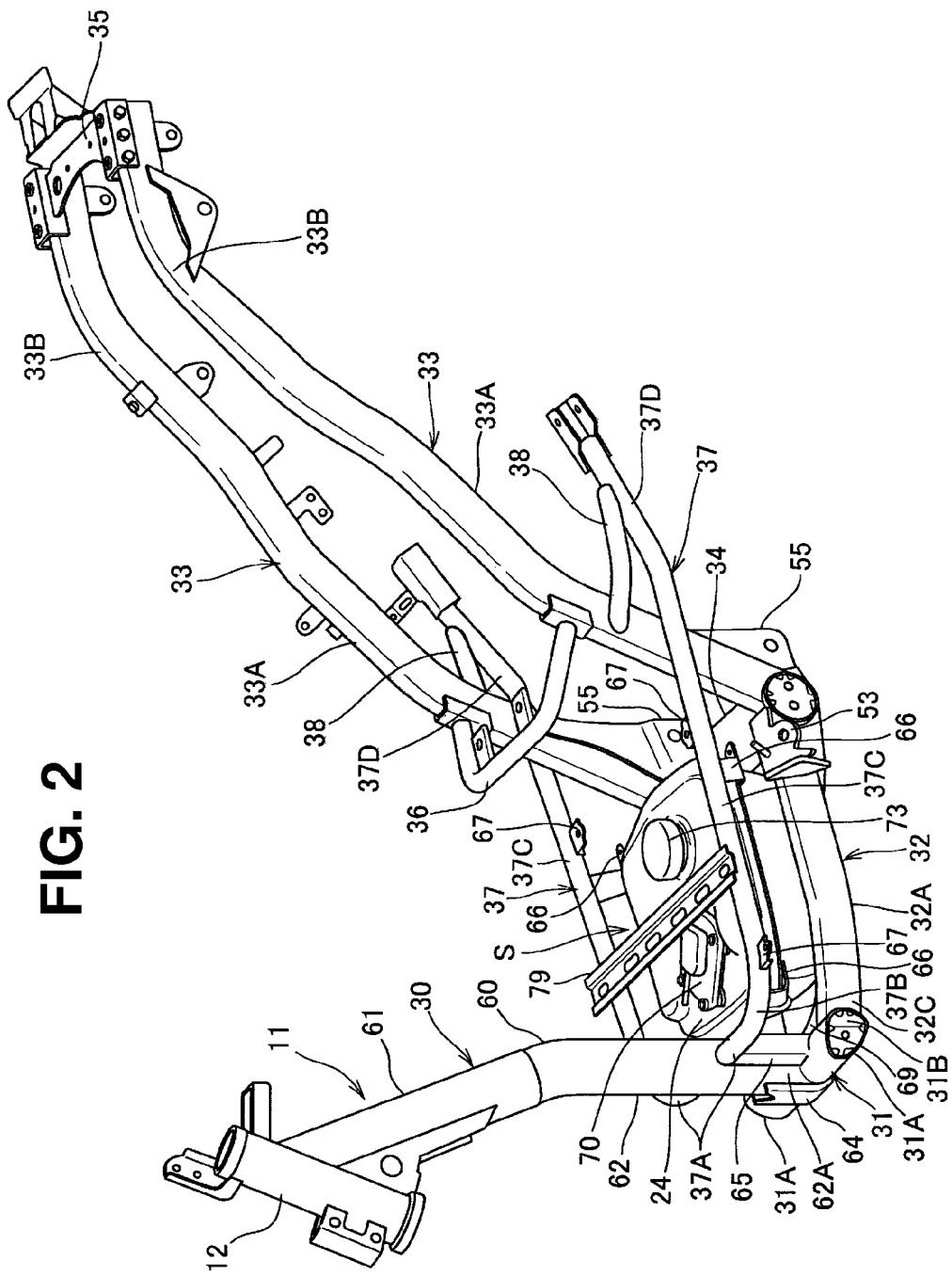
FIG. 2 is a perspective view of a body frame.
Figure 3:
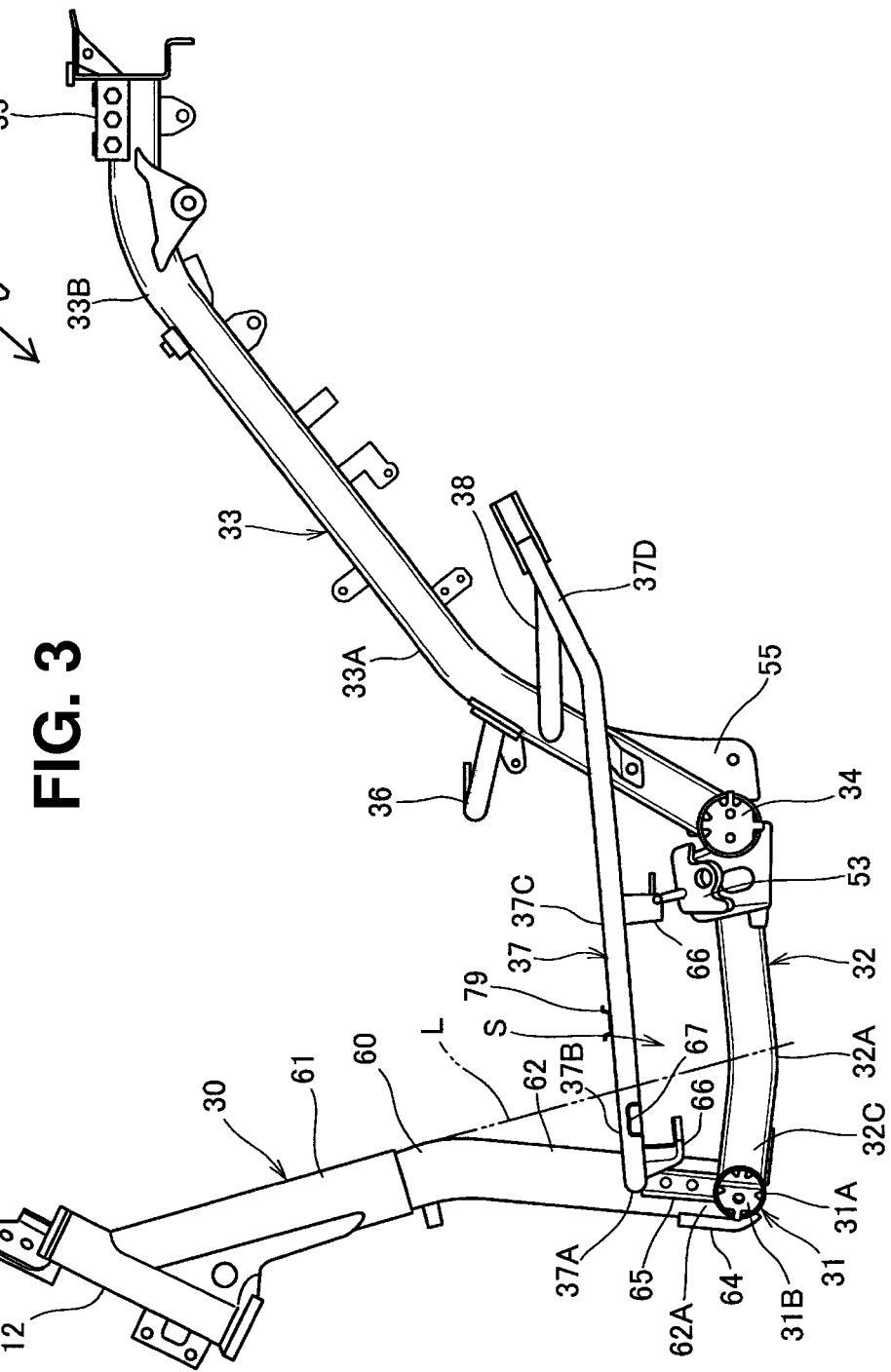
FIG. 3 is a left side plan view of the body frame.
Figure 4:
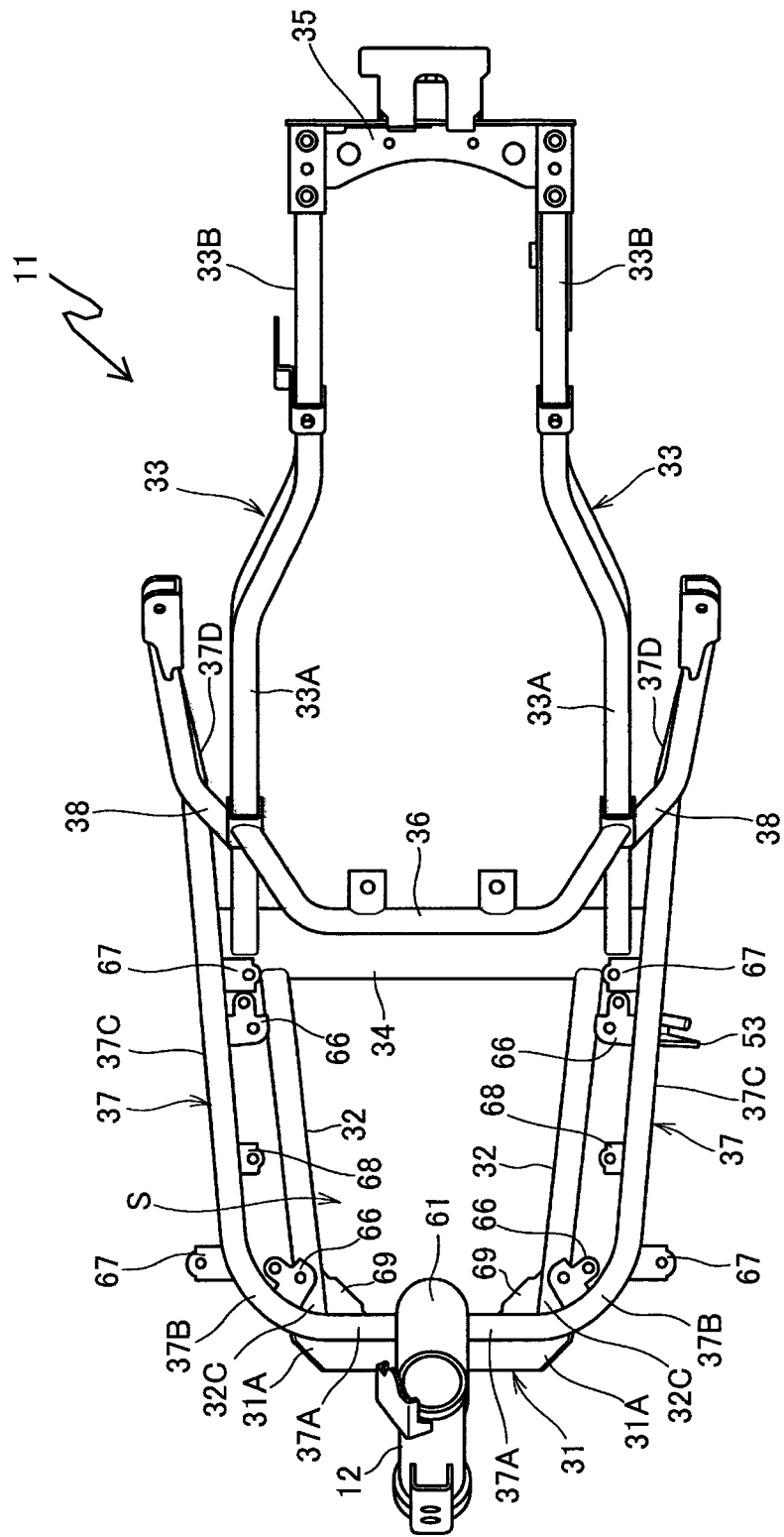
FIG. 4 is a top plan view of the body frame.

FIG. 2 is a perspective view of the body frame 1. FIG. 3 is a left side plan view of the body frame 11. FIG. 4 is a top plan view of the body frame 11, as viewed from above.

As shown in FIGS. 1 to 4, the body frame 11 includes: the head pipe 12; a single main frame section 30 extending rearwardly downward from a rear surface of the head pipe 12; and a front cross frame section 31 joined to a lower portion of the main frame section 30 and extending in the vehicle width direction. The body frame 11 also includes a pair of left and right lower frame sections 32, 32 extending rearward from left and right ends of the front cross frame section 31; a center cross pipe 34 provided at rear portions of the lower frame sections 32, 32 and interconnecting the left and right lower frame sections 32, 32; and a pair of spaced apart rear frame sections 33, 33 extending rearwardly upward from opposite ends of the center cross pipe 34 to a vehicle rear portion.

A steering system, including the front wheel 14 and the front fork 13, is rotatably supported by a steering shaft (not shown) pivotally and steerably supported on the head pipe 12.

A rear cross frame section 35 is also provided at the rear ends of the rear frame sections 33, 33, which interconnects the left and right rear frame sections. A cross pipe 36 is provided at mid-portions of the rear frame sections 33, 33 located under the luggage box 19, and this cross pipe 36 interconnects the left and right rear frame sections 33, 33, as shown.

Over the left and right lower frame sections 32, 32, a pair of left and right floor support members 37, 37 are provided by which the main frame section 30 is connected with the left and right rear frame sections 33, 33. Rear portions of the floor support members 37, 37 are connected to pillion step brackets 38, 38 projecting in the vehicle width direction from the rear frame sections 33, 33. Pillion steps 39 (FIG. 1) on which feet of a pillion passenger seated on a rear portion of the seat 20 are to be put are attached to the pillion step brackets 38, 38.

A side stand bracket 53 is provided on the left lower frame section 32, and a foldable side stand 54 (FIG. 1) is attached to the side stand bracket 53.

In addition, power unit connecting sections 55 to which the power unit 16 is to be connected are provided on rear surfaces of front portions of the rear frame sections 33, 33.

The power unit 16 has an engine 21 at the front and a transmission mechanism 22 which is continuous with a rear portion of the engine 21 and through which the rear wheel 17 is driven. The power unit 16 is swingably connected to the power unit connecting sections 55 through links 23 which are connected to front portions of the power unit 16. The power unit 16 extends rearward under the rear frame sections 33 and rotatably supports the rear wheel 17; thus, the power unit 16 is a unit swing type engine which functions also as a swing arm for supporting the rear wheel 17.

To an upper portion of the power unit 16, an air cleaner box 25 is connected by which intake air is cleaned before being supplied to the engine 21. A muffler 28 extending from the engine 21 is disposed on the right side of the rear wheel 17.

In addition, on a left side surface of the power unit 16 a kick pedal 26 is provided which is to be kicked to start the engine 21. A main stand 27 is mounted at the lower portion of the power unit 16 for supporting the motorcycle M upright.

As shown in FIG. 1, the body cover 44 includes: a front cover 45 covering the front of the head pipe 12 and the main frame section 30; a leg shield 46 connected to the front cover 45 and covering the rear of the head pipe 12 and the main frame section 30; a step floor 47 connected to a lower portion of the leg shield 46 and covering the left and right floor support members 37, 37 from above; a floor under cover 48 connected to a lower portion of the front cover 45 and covering the step floor 47 from below; a seat under cover 49 covering the front of the luggage box 19; a pair of left and right rear covers 50 covering the rear frame sections 33, 33 and the luggage box 19 from lateral sides; and a tail cover 51 covering the rear side of the vehicle under the seat 20.

Left and right side portions of the floor under cover 48 cover the lower frame sections 32, 32 and the floor support members 37, 37 from outer sides.

The periphery of the handlebar 15 is covered with a handle cover 41. A front fender 42 covering the upper side of the front wheel 14 is provided on the front fork 13, while a rear fender 43 covering the upper side of the rear wheel 17 is provided under the rear cover 50.

The luggage box 19 is opened and closed with the seat 20 which can be opened and closed. A helmet H and the like can be stored in the luggage box 19. A grab bar 29 is provided around a rear portion of the seat 20. The fuel tank 24 as an energy storage box for storing a fuel for the engine 21 is disposed under the step floor 47.

Now, a support structure for the body frame 11 and the fuel tank 24 will be described in detail below.

The main frame section 30 is a pipe having a circular cross-sectional shape, welded to the rear surface of the head pipe 12 and extending rearwardly downward. The main frame section 30 is bent into a rearwardly projecting shape at a bend point 60 at a vertically intermediate portion thereof, and, under the bend point 60, it extends forwardly downward. Thus, the main frame section 30 has a main frame section upper portion 61 extending rearwardly downward from the head pipe 12, the bend point 60, and a main frame section lower portion 62 extending forwardly downward under the bend point 60. The main frame section upper portion 61 is inclined rearwardly downward with reference to the vertical direction, whereas the main frame section lower portion 62 is inclined forwardly downward with reference to the vertical direction.

Figure 5:
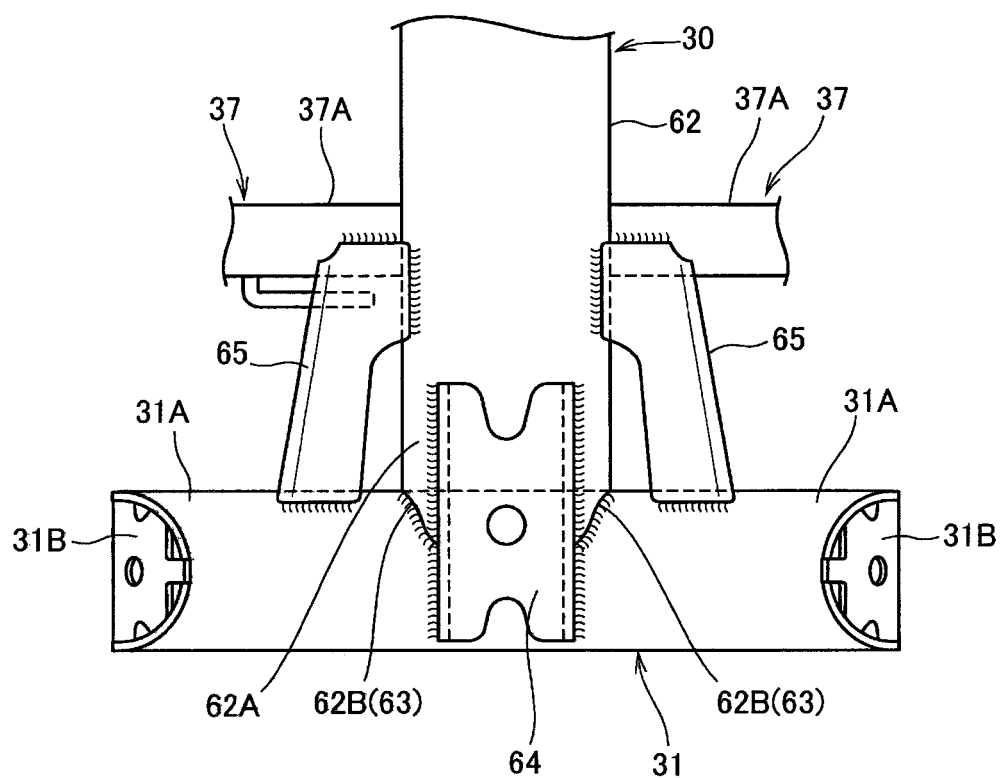
FIG. 5 is a front plan view of a joint section between a main frame section and a front cross frame section.

FIG. 5 is a front view, as viewed from the front side, of a joint section between the main frame section 30 and the front cross frame section 31.

As shown in FIGS. 2, 3 and 5, the front cross frame section 31 is a single pipe having a circular cross-sectional shape and extending rectilinearly in the vehicle width direction, and an axially middle part thereof is welded to a lower end portion 62A of the main frame section lower portion 62. More specifically, cutout sections 62B cut out in an arcuate shape conforming to the shape of an outer peripheral surface of the front cross frame section 31 are formed at left and right lower edges of the lower end portion 62A. The front cross frame section 31 is fitted into the cutout sections 62B from below, and is joined to the main frame section 30 by weld beads 63 formed along edge portions of the cutout sections 62B.

In addition, a plate-shaped reinforcement plate 64 extends between and welded to the lower end portion 62A and the front cross frame section 31. A front surface of the front cross frame section 31 and a front surface of the main frame section lower portion 62 are interconnected by the reinforcement plate 64.

The lower frame sections 32, 32 are pipes having a rectangular cross-sectional shape, welded respectively to rear surfaces of the left and right end portions 31A, 31A of the front cross frame section 31 at front end portions 32C thereof, and extending rearward. The rear ends of the lower frame sections 32, 32 are welded to the front side of the left and right end portions of the center cross pipe 34 which is circular in cross-sectional shape. The front end portions 32C are cut out in an arcuate shape according to the shape of the outer peripheral surface of the front cross frame section 31. In addition, corner reinforcement plates 69 for connecting the rear edge of the front cross frame section 31 and front inner edges of the lower frame sections 32, 32 to each other are welded to the joints between the end portions 31A, 31A and the lower frame sections 32, 32.

As shown in FIG. 4, the center cross pipe 34 is longer than the front cross frame section 31, so that the width between the lower frame sections 32, 32 increases along the direction toward the center cross pipe 34.

In addition, as shown in FIG. 3, the lower frame sections 32, 32 are bent into a downwardly projecting shape so that they are provided at back-and-forth-directionally intermediate portions thereof with lowest-point parts 32A constituting the lowest points of lower surfaces of the lower frame sections 32, 32.

The rear frame sections 33, 33 are pipes being rectangular in cross-sectional shape and welded to the upper surface side of the center cross pipe 34. As shown in FIG. 4, the rear frame sections 33, 33 have larger-width portions 33A which extend rearward and at which the width between the rear frame sections 33, 33 is larger than the width between the lower frame sections 32, 32, and rear portions 33B at which the width between the rear frame sections 33, 33 is smaller than that of the larger-width portions 33A.

The pillion step brackets 38, 38 are pipes having a circular cross-sectional shape, welded to side surfaces of the rear frame sections 33, 33 at the upper side of the floor support members 37, 37, and extending rearward while projecting outward in the vehicle width direction.

The floor support members 37, 37 are pipes having a circular cross-sectional shape and supporting the step floor 47 from below. The floor support members 37, 37 include: front-side joint sections 37A (front end portions) welded respectively to the left and right side surfaces of the main frame section lower portion 62 and extending in the vehicle width direction; front-side bent sections 37B bent in an arcuate shape from the front-side joint sections 37A toward the rear side; floor support sections 37C extending from the front-side bent sections 37B to the rear side of the rear frame sections 33, 33; and rear joint sections 37D (rear end portions) welded to ends of the pillion step brackets 38, 38.

As shown in FIG. 5, reinforcement pieces 65 for interconnecting the front-side joint sections 37A and the main frame section lower portion 62 are welded to the front surface side of the front-side joint sections 37A. The reinforcement pieces 65 extend downward, to be welded also to an upper surface of the front cross frame section 31. Thus, the front-side joint sections 37A, the main frame section lower portion 62 and the front cross frame section 31 are interconnected by the reinforcement pieces 65, whereby the floor support members 37, 37 and the front cross frame section 31 can be rigidly welded to the main frame section lower portion 62 using a small number of reinforcement members.

As shown in FIGS. 2 to 4, the floor support members 37, 37 have their front-side bent sections 37B extending vehicle-width-directionally outward beyond the lower frame sections 32, 32, are located on the vehicle-width-directionally outer sides than the lower frame sections 32, 32 at their left and right floor support sections 37C, and then extend rearward substantially in parallel to the lower frame sections 32, 32. Thus, the lower frame sections 32, 32 and the floor support members 37, 37 are located on the vehicle-width-directionally outer sides in the body frame 11. As a result, a large-width space between the left and right lower frame sections 32, 32 and between the left and right floor support members 37, 37 constitutes a storage space S in which a vehicle component part or an article, such as the fuel tank 24, can be disposed. The storage space S is formed between the main frame section lower portion 62 as well as the front cross frame section 31 and the center cross pipe 34. In the present embodiment, the fuel tank 24 is stored in the storage space S.

At inner edge portions of the front-side bent sections 37B and at inner edge portions of the floor support sections 37C, tank stays 66 are respectively provided which project inward in the vehicle width direction. The tank stays 66 are respectively provided on the left and right floor support members 37, 37, and the fuel tank 24 is supported on the floor support members 37, 37 through the tank stays 66 at four locations.

In addition, at outer edge portions of the floor support sections 37C and at inner edge portions of the floor support sections 37C, floor stays 67 to which to connect the step floor 47 are provided respectively.

Further, at inner edge portions of the floor support sections 37C, cross member stays 68 are provided which project inward in the vehicle width direction.

Figure 6:
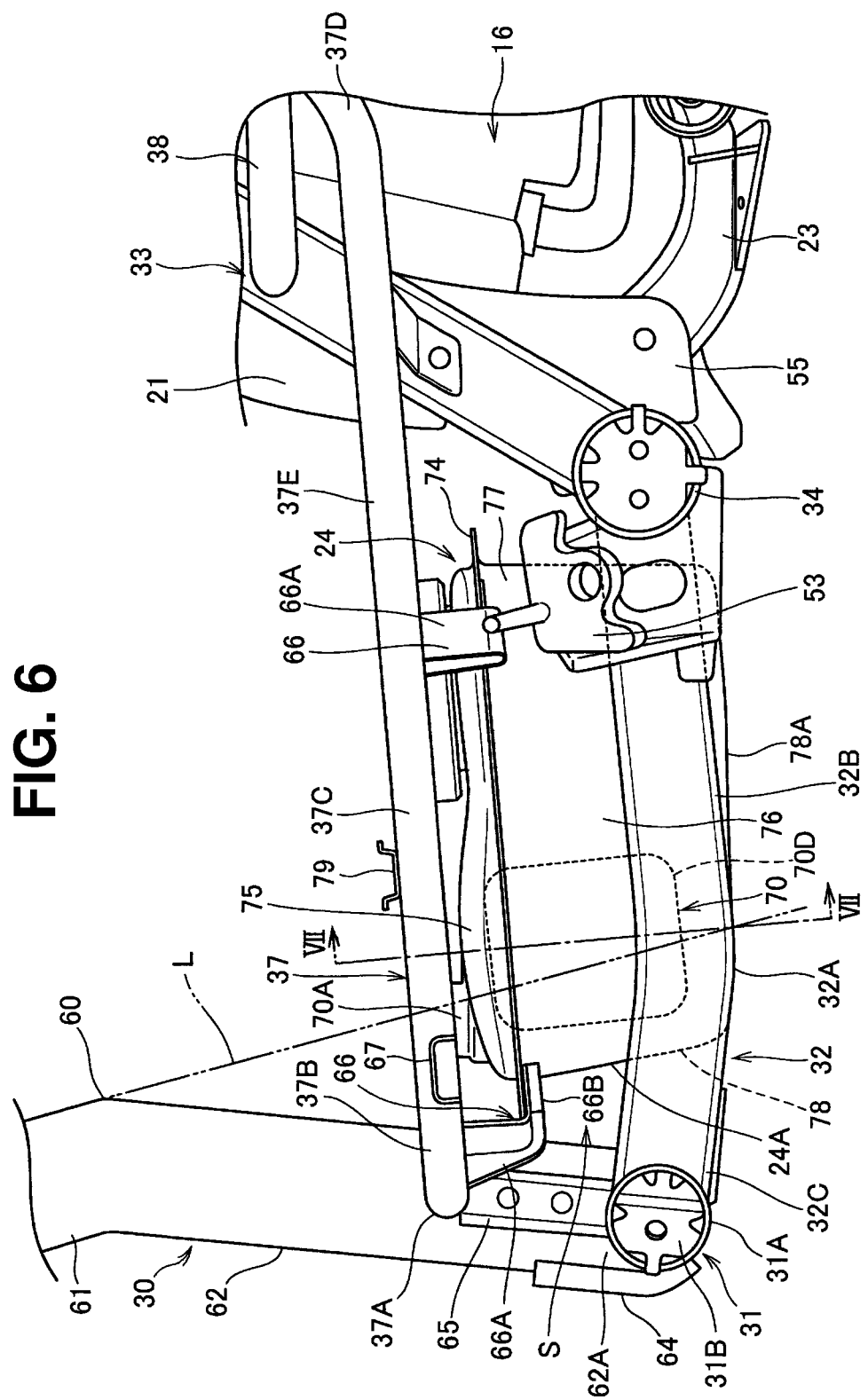
FIG. 6 is a left side plan detail view, showing a fuel tank disposed in a storage space.
Figure 7:
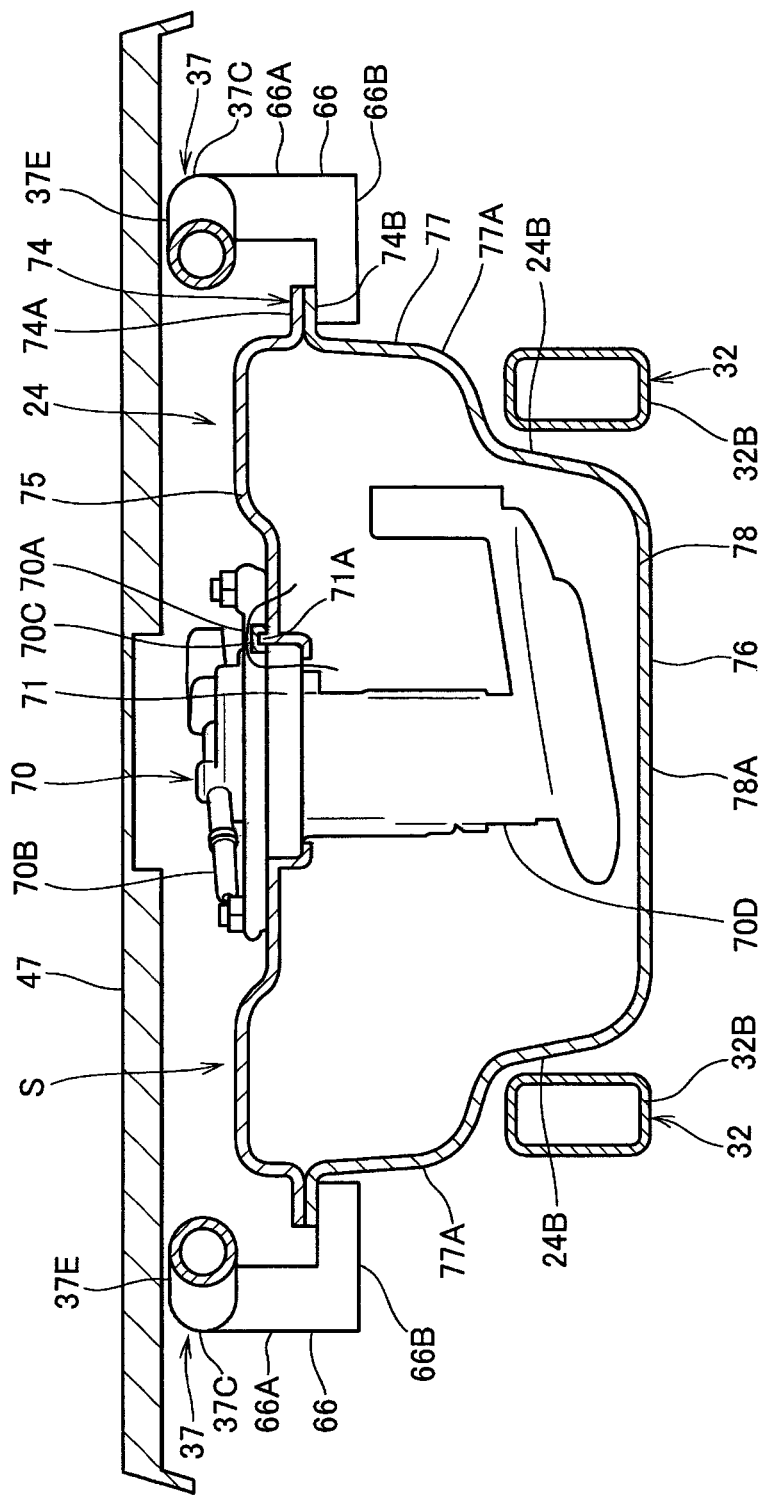
FIG. 7 is a sectional view taken along line VII-VII of FIG. 6.
Figure 8:
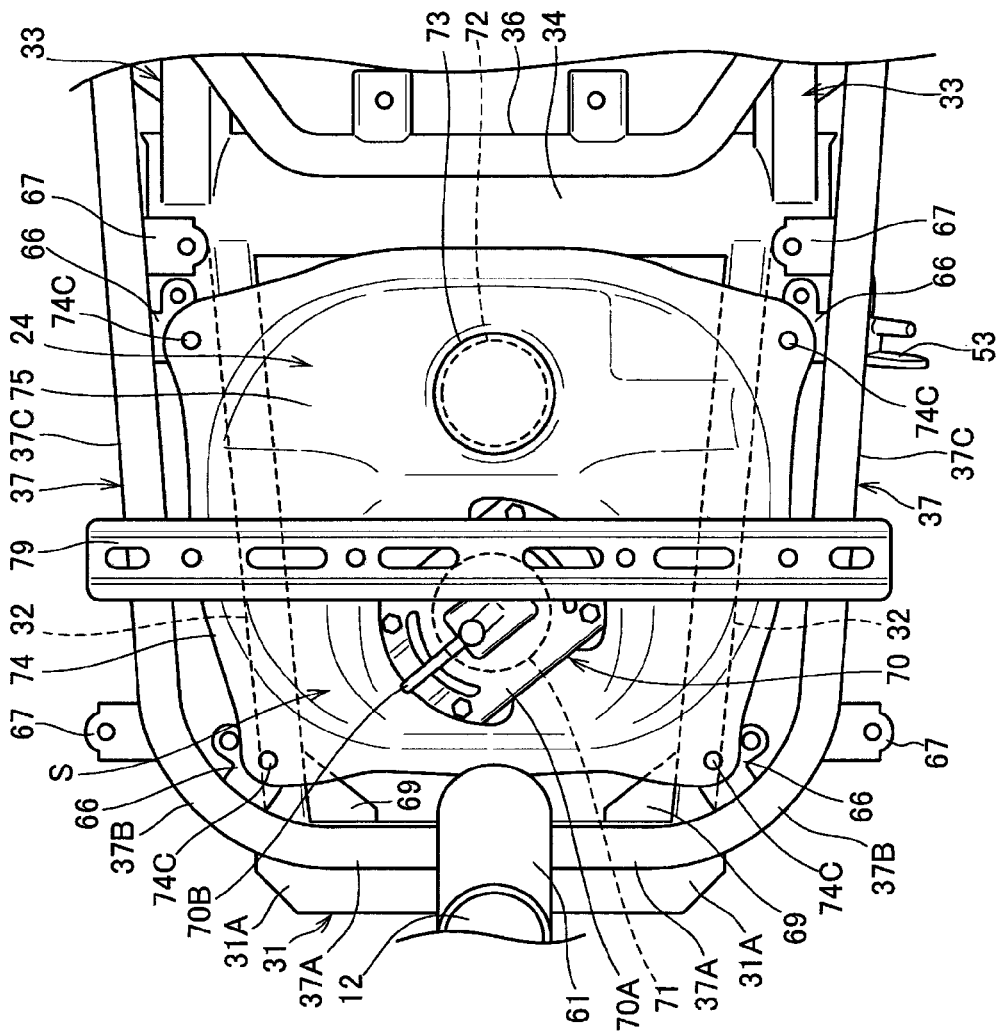
FIG. 8 is a top plan detail view of the fuel tank installed in the frame, showing the fuel tank disposed in the storage space.
Figure 9:
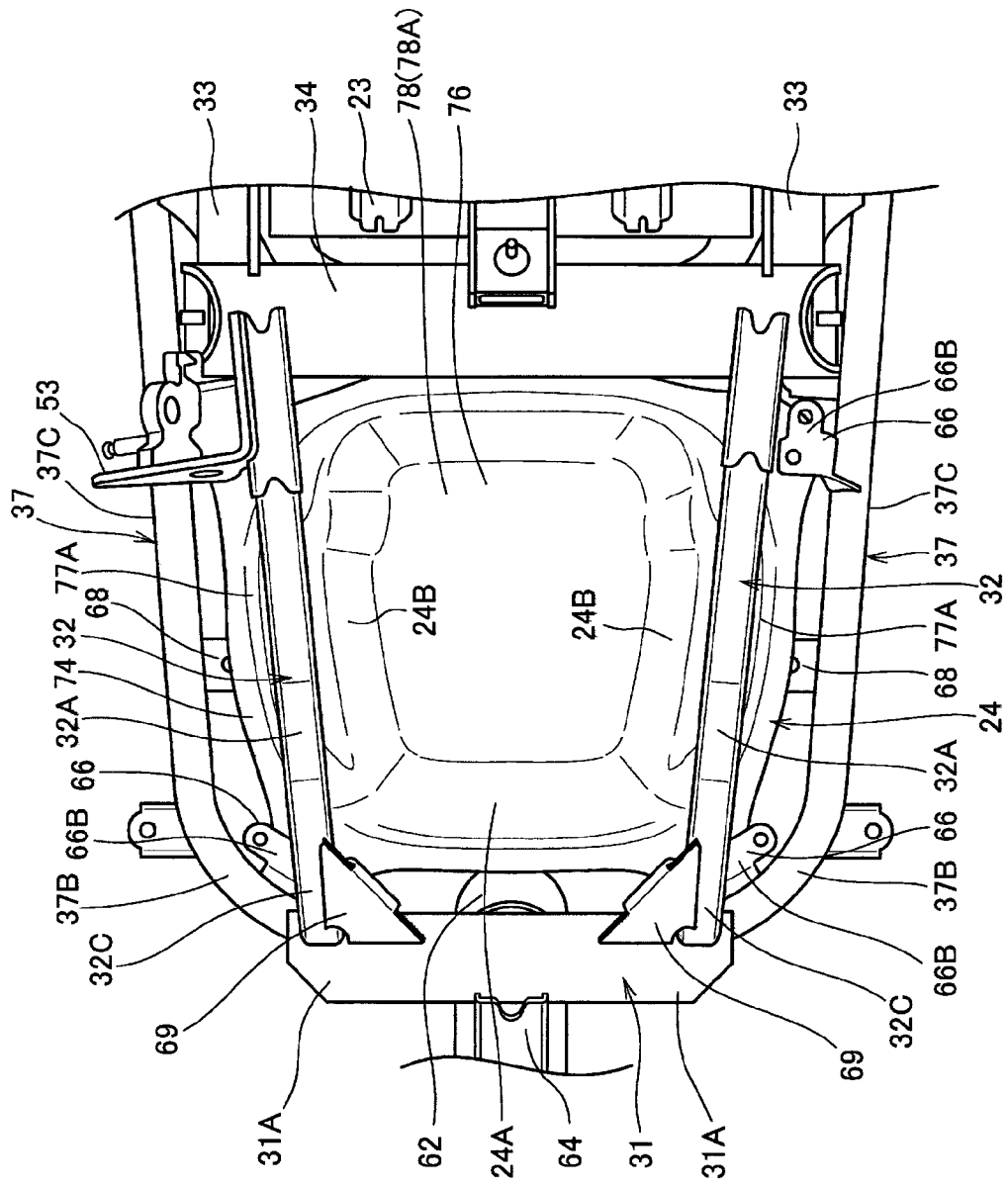
FIG. 9 is a bottom plan detail view of the fuel tank installed in the frame, showing the fuel tank disposed in the storage space.

FIG. 6 is a left side plan detail view showing the fuel tank 24 disposed in the storage space S. FIG. 7 is a sectional view taken along line VII-VII of FIG. 6. FIG. 8 is a top plan view, as viewed from above, showing the fuel tank 24 disposed in the storage space S. FIG. 9 is a bottom plan view, as viewed from below, showing the fuel tank 24 disposed in the storage space S.

As shown in FIGS. 6 to 9, the fuel tank 24 is a box-type fuel tank in which a fuel pump 70 is incorporated, for supplying the engine 21 with fuel. The fuel tank 24 is provided at its upper surface with a pump installation opening 71 in which the fuel pump 70 is inserted, and a circular fuel filler access hole 72, located rearwardly of the pump installation opening 71. The fuel filler access hole 72 is openably closed with a filler cap 73. The fuel pump 70 is provided at an upper portion thereof with a pump fixation section 70A exposed to the outside through the pump installation opening 71. The fuel pump 70 is fixed to the fuel tank 24 by bolts passed through the pump fixation section 70A.

The pump fixation section 70A is provided with a fuel hose connecting pipe 70B to which to connect a fuel hose (not shown) connected with the engine 21 side. The fuel pump 70 is disposed in a front portion of the fuel tank 24, and a lower portion of a pump body 70D provided inside the fuel tank 24 extends to the vicinity of a bottom surface of the fuel tank 24.

At a side surface of an upper portion of the fuel tank 24 a flange section 74 is provided which projects substantially horizontally to the outside of the fuel tank 24. The flange section 74 is provided along the whole circumference of the side surface of the fuel tank 24. The flange section 74 is formed in four corners thereof with fixing holes 74C at positions corresponding to the tank stays 66.

As shown in FIG. 7, the fuel tank 24 is formed in a box-like shape by joining together an upper half 75 constituting an upper portion and a lower half 76 constituting a lower portion. The upper half 75 and the lower half 76 are each formed by drawing of a steel sheet by use of a press die.

The upper half 75 is provided with the pump installation opening 71, the fuel filler access hole 72, and an upper-side flange section 74A projecting outward. The upper half 75 is formed in a roughly rectangular shape as viewed from above. The pump installation opening 71 and the fuel filler access hole 72 are disposed in the state of being aligned along the back-and-forth direction, in succession to and rearwardly of the head pipe 12, and are each located at vehicle-width-directionally central position.

The pump installation opening 71 is provided with a seal engagement section 71A (FIG. 7) for engagement with a seal section 70C (FIG. 7) formed at the lower surface of the pump fixation section 70A. The seal engagement section 71A is integrally formed at the time of drawing of the upper half 75. The upper half 75 is a lid body for closing the upper side of the lower half 76, and the depth of drawing thereof is comparatively small. This ensures that, even where the seal engagement section 71A is formed by drawing, the deformation amount of the upper half 75 is not so large, so that the flatness and dimensional accuracy of the upper surface of the upper half 75 can be secured at a favorable level. Therefore, the pump installation opening 71 and the fuel filler access hole 72, which are required to have such a dimensional accuracy that the fuel can be hermetically enclosed, can be disposed proximate to each other, and the degree of freedom in designing can be enhanced. In addition, since the upper half 75 is a drawn product, the upper half 75 has a draft angle such that the width of its side surface portions is narrowed along the upward direction. In this embodiment, however, the depth of drawing of the upper half 75 is small and the draft angle would little influence the area of the upper surface; accordingly, a large area of the upper surface of the upper half 75 can be secured, and the degree of freedom in layout of the pump installation opening 71 and the fuel filler access hole 72 is enhanced.

The lower half 76 has a fuel storage section which is drawn more deeply than the upper half 75. The lower half 76 is formed in conformity with the shapes of the floor support members 37, 37 and the lower frame sections 32, 32 so that a large amount of fuel can be stored between the left and right floor support members 37, 37 and between the left and right lower frame sections 32, 32. The lower half 76 has an upper storage section 77 provided above the lower frame sections 32, 32 and a lower storage section 78 provided between the lower frame sections 32, 32. The upper storage section 77 has bulging sections 77A which on the inside of the floor support members 37, 37 bulge to the outer sides relative to the outer surfaces of the lower frame sections 32, 32 and connect to the upper half 75. In this way the bulging sections 77A which bulge to the outer sides relative to the outer surfaces of the lower frame sections 32, 32 are disposed, resulting in the length of the fuel tank 24 in the vehicle width direction being greater than the length in the back-and-forth direction.

The upper storage section 77 is formed at its upper edge portion with a lower-side flange section 74B. The upper-side flange section 74A and the lower-side flange section 74B are welded to each other, whereby the flange section 74 is formed. Not any section, such as a hole, that requires high accuracy is arranged at the bottom surface of the lower half 76, and, therefore, the lower half 76 can easily be deep drawn.

The tank stay 66 is formed in a roughly L shape, while having a substantially vertical section 66A extending downward from the floor support members 37, 37 and a support plate section 66B extending from the lower end of the vertical section 66A to the vehicle-width-directionally inner side. The tank stay 66 is located on the vehicle-width-directionally outer side relative to the lower frame sections 32, 32.

In the state in which the flange section 74 is mounted on the support plate section 66B, the fuel tank 24 is fastened to the support plate section 66B by fixing bolts (not shown) passed through the fixing holes 74C and is fixed in a predetermined position inside the storage space S. In this condition, the left and right bulging sections 77A are projecting to the outer sides relative to the lower frame sections 32, 32, over the whole range in the back-and-forth direction of the fuel storage section of the fuel tank 24. Since the bulging sections 77A bulging to the outer sides of the lower frame sections 32, 32 are thus provided, the capacity of the fuel tank 24 can be enlarged.

As shown in FIG. 9, the lower storage section 78 is located in a lower portion of the storage space S, and is disposed in the state of being surrounded by the front cross frame section 31 and the center cross pipe 34 on the front and rear sides thereof and by the lower frame sections 32, 32 on the left and right sides thereof.

As shown in FIG. 6, the fuel tank 24 is disposed to be slightly higher on the rear side so that it is located lowest on the pump body 70D side. The lower surface 78A of the lower storage section 78 is inclined to be higher on the rear side.

The lower surface 78A of the lower storage section 78 extends to the vicinity of lower edges 32B of the lower frame sections 32, 32. More in detail, the lower edges 32B of the lower frame sections 32, 32 extend in the back-and-forth direction to be along the lower surface 78A in side view, and the lowest-point parts 32A of the lower frame sections 32, 32 having a downwardly projecting shape are located below the lower surface 78A, at a position just under the pump body 70D. Therefore, the lower surface 78A just under the pump body 70D can, and hence the pump body 70D can, be guarded by the lowest-point part 32A. Accordingly, it is unnecessary to reinforce the fuel pump 70, and the shape of the fuel pump 70 can be simplified. In addition, since the lowest point of the lower surface 78A is formed just below the pump body 70D and the lower surface 78A is not present below the lowest-point part 32A, the lower surface 78A can be guarded by the lowest-point part 32A. Therefore, it is unnecessary to reinforce the lower surface 78A of the fuel tank 24, and the shape of the fuel tank 24 can be made simpler.

The fuel tank 24 is supported in the manner of being hung from the floor support members 37, 37 through the tank stays 66, and upper edges 37E of the floor support members 37, 37 are located above the upper surface of the fuel tank 24 and the upper surface of the pump fixation section 70A in side view. In other words, the fuel tank 24 and the fuel pump 70 are provided below the step floor 47 supported on the upper edges 37E. Therefore, the fuel tank 24 and the fuel pump 70 are guarded by the floor support members 37, 37 and the step floor 47. Consequently, the fuel pump 70 can be simplified.

In addition, a plate-shaped cross member 79 extends in the vehicle width direction between the floor support members 37, 37. The cross member 79 is located over the pump fixation section 70A, thereby covering the pump fixation section 70A from above. The cross member 79 is disposed below the step floor 47, and is fastened to the cross member stays 68 (FIG. 4). The step floor 47 is supported from below by the cross member 79 over its range in the vehicle width direction, so that the step floor 47 can be prevented from bending largely downward.

As shown in FIG. 7, the floor support members 37, 37 are sub-frames which bear the weight of the fuel tank 24 and a load acting on the step floor 47. The diameter of each of the floor support members 37, 37 is set to be smaller than the width of each of the lower frame sections 32, 32. With the floor support members 37, 37 are set small in diameter, the bulging sections 77A of the fuel tank 24 can be extended more toward the floor panel support member 37, 37 sides, whereby the capacity of the fuel tank 24 can be enlarged.

In addition, since the lower frame sections 32, 32 are rectangular pipes having a rectangular cross-sectional shape that is elongated in the vertical direction, the spaces occupied by the lower frame sections 32, 32 in the vehicle width direction can be reduced while securing rigidity. Therefore, the lower storage section 78 can be disposed closer to the lower frame section 32, 32 sides to thereby enlarge the capacity of the fuel tank 24, and the amounts of projection of the lower frame sections 32, 32 outward in the vehicle width direction can be reduced. Consequently, a large bank angle can be secured for the vehicle.

Further, since the fuel tank 24 is fixed in the manner of being hung from the floor support members 37, 37, the rigidity of the fuel tank 24 is less liable to affect the rigidity of the body frame 11. Accordingly, rigidity designing for the body frame 11 can be accomplished easily.

In the present embodiment, the flange section 74 is secured to the tank stays 66, whereby the fuel tank 24 is fixed in the manner of being hung from the floor support members 37, 37 above the lower frame sections 32, 32. Therefore, the flange section 74 constituting a parting face between the upper half 75 and the lower half 76 can be located at a higher position. This ensures that as above-mentioned, the depth of drawing of the upper half 75 can be made smaller, and formability of the upper half 75 is enhanced. Accordingly, the flatness and dimensional accuracy of the upper surface of the upper half 75 can be secured at satisfactory levels. As a result, the pump installation opening 71 and the fuel filler access hole 72 can be disposed proximate to each other, so that the degree of freedom in design can be enhanced.

The rear joint sections 37D of the floor support members 37, 37 are supported by the pillion step brackets 38, 38 which project toward the vehicle-width-directionally outer sides from the rear frame sections 33, 33. Therefore, it is unnecessary to provide exclusive members for supporting rear end portions of the floor support members 37, 37 which project toward the vehicle-width-directionally outer sides. Thus, the floor support members 37, 37 can be supported with a simple structure.

As shown in FIGS. 6, 8 and 9, the front end portions 32C of the lower frame sections 32, 32 are welded to the left and right end portions 31A, 31A of the front cross frame section 31 which is welded to the main frame section lower portion 62 and extends rectilinearly along the vehicle width direction. Therefore, no large bent portions are formed in the vicinity of the joints between the end portions 31A, 31A and the front end portions 32C of the lower frame sections 32, 32. This ensures that a front surface 24A of the fuel tank 24 can be disposed more proximate to the front cross frame section 31, and the left and right side surfaces 24B of the fuel tank 24 can be disposed more proximate to the inner edges of the lower frame sections 32, 32. Consequently, the fuel tank 24 can be enlarged in capacity.

As shown in FIGS. 3 and 6, the main frame section 30 is bent in a rearwardly projecting shape at the bend point 60 in the vicinity of a height-directionally middle part thereof, and the main frame section lower portion 62 extends forwardly downward. Therefore, the main frame section lower portion 62 can be disposed on the more forward side while keeping the main frame section lower portion 62 from coming too close to the front wheel 14, and the storage space S can be extended more forward while securing a clearance between the front wheel 14 and the main frame section 30. This makes it possible to enlarge the capacity of the fuel tank 24. In addition, since the storage space S is extended forward by bending the main frame section lower portion 62 toward the front side, the storage space S can be enlarged without influencing the wheel base between the front wheel 14 and the rear wheel 17.

Here, the shape of the main frame section 30 is so set that a sufficient clearance can be secured between the front wheel 14 and the main frame section 30 when a large stroke of the front fork 13 is made. In view of this, in order that the bend at the bend point 60 will not heavily affect the clearance, it is preferable to provide the bend point 60 in the vicinity of the height-directionally middle part or at a position below the middle part of the main frame section 30.

In addition, as shown in FIG. 6, the main frame section lower portion 62 extends forwardly downward, so that the storage space S is broadened toward the front side by an amount according to the forward inclination of the main frame section lower portion 62. Specifically, the front portion of the storage space S is disposed to range up to the front side relative to a position on the extension line L of the rear edge of the main frame section upper portion 61 which is above the bend point 60. Therefore, the fuel tank 24 can be extended more forward, whereby the capacity of the fuel tank 24 can be enlarged.

As shown in FIG. 1, the space which is on the front lower side of the seat 20 and is surrounded by the leg shield 46, the step floor 47 and the seat under cover 49 constitutes a leg-passing space K through which the driver to be seated on the seat 20 can let his or her leg pass from one side to the other side of the vehicle at the time of getting on or off the vehicle.

A front portion of the leg-passing space K is partitioned by the leg shield 46 which covers the rear of the head pipe 12 and the main frame section 30. The leg shield 46 includes a front slant section 46A extending rearwardly downward along the rear edge of the main frame section upper portion 61, and a rear slant section 46B extending forwardly downward along a rear edge of the main frame section lower portion 62. The rear slant section 46B extends to below the bend point 60, to be connected to the step floor 47. Since the leg shield 46 is thus provided with the rear slant section 46B along the main frame section lower portion 62 extending forwardly downward from the bend point 60, a lower portion of the leg-passing space K can be broadened by extending it more forward, whereby the driver is permitted to get on and off the motorcycle M more easily.

As has been described above, according to the embodiment to which the present invention is applied, the fuel tank 24 is disposed between the pair of left and right lower frame sections 32, 32, and the floor support members 37, 37 disposed under the step floor 47 are disposed in a left-right pair on the outer sides relative to the lower frame sections 32, 32. In addition, the fuel tank 24 is supported by the floor support members 37, 37, and the lower frame sections 32, 32 are so disposed that their lower edges 32B extend along the lower surface 78A of the fuel tank 24. Therefore, the fuel tank 24 can be extended in the left-right direction to the sides of the floor support members 37, 37 on the outer sides relative to the lower frame sections 32, 32 and can be extended to the level of the lower edges 32B of the lower frame sections 32, 32. Accordingly, the capacity of the fuel tank 24 can be enlarged. In addition, the lower surface 78A of the fuel tank 24 can be guarded by the lower edges 32B of the lower frame sections 32, 32 that extend along the lower surface 78A of the fuel tank 24. As a result, the fuel tank 24 can be simplified in structure.

In addition, since the upper edges 37E of the floor support members 37, 37 are located above the fuel pump 70 attached to the upper surface of the fuel tank 24, the fuel pump 70 can be guarded utilizing the floor support members 37, 37. Accordingly, the fuel tank 24 can be simplified in structure. Further, since the upper edges 37E of the floor support members 37, 37 are located above the fuel pump 70 attached to the upper surface of the fuel tank, the distance between the floor support members 37, 37 and the step floor 47 is easy to maintain.

In addition, the fuel pump 70 is covered by the cross member 79 which extend between the left and right floor support members 37, 37 on the upper side of the fuel pump 70. The distance between the fuel pump 70 and the step floor 47 is easy to maintain by the cross member 79.

Furthermore, since the lower frame sections 32, 32 are bent in a downwardly projecting shape such that their lowest-point parts 32A are located in the vicinity of the fuel pump 70 in side view, the fuel pump 70 can be guarded by the lower frame sections 32, 32. Consequently, the fuel pump 70 can be simplified in structure.

In addition, the floor support members 37, 37 have their front-side joint sections 37A supported by the main frame section lower portion 62 and have their rear joint sections 37D supported by the rear frame sections 33, 33 extending rearwardly upward from the rear end portions of the lower frame sections 32, 32. This ensures that the floor support members 37, 37 can be supported with a simple structure, by utilizing the rear frame sections 33, 33.

In addition, the rear joint sections 37D of the floor support members 37, 37 are supported by the pillion step brackets 38, 38 which are provided to project toward vehicle-width-directionally outer sides from the rear frame sections 33, 33.

Therefore, it is unnecessary to provide exclusive members for supporting the rear joint sections 37D of the floor support members 37, 37 which project toward vehicle-width-directionally outer sides. Accordingly, the floor support members 37, 37 can be supported with a simple structure, and it is possible to project the fuel tank 24 in the vehicle width direction and thereby to enlarge the capacity of the fuel tank 24.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In a body frame of a saddle-type vehicle where said body frame includes a head pipe which steerably supports a steering system including a front wheel, a main frame section extending rearwardly downward from said head pipe, and a pair of left and right lower frame sections extending substantially horizontally rearward from a lower portion of said main frame section,
and where a fuel tank is disposed rearwardly of said main frame section with a portion thereof disposed between said left and right lower frame sections, a fuel pump is provided for pumping fuel out of said fuel tank, and a floor panel is disposed above said fuel tank for supporting a driver's feet thereon,
the improvement comprising a fuel tank support structure comprising:
a pair of spaced apart floor support members provided below said floor panel, said floor support members extending laterally outside of said lower frame sections, wherein said floor support members are operatively attached to said fuel tank to provide support thereto, wherein said fuel pump is attached to an upper surface of said fuel tank, and wherein upper edges of said floor support members are located above said fuel pump,
and wherein said lower frame sections are disposed such that lower edges thereof extend proximate a lower surface of said fuel tank, and wherein the fuel tank is extended in a left-right direction on the sides to the floor support members beyond the lower frame sections in the left-right direction and is extended to the level of the lower edges of the lower frame sections.

2. The fuel tank support structure of claim 1, wherein a tank stay is extended downwardly from each of said floor support members, respectively, and wherein said fuel tank is supported between said tank stays.

3. The fuel tank support structure of claim 2, wherein a cross member extends between said left and right floor support members above said fuel pump.

4. The fuel tank support structure of claim 1, wherein the body frame further comprises a pair of rear frame sections extending rearwardly and upwardly from rear end portions of said lower frame sections, and wherein said floor support members are supported at their front end portions by said main frame section and at their rear end portions by said rear frame sections.

5. The fuel tank support structure of claim 4, wherein said rear end portions of said floor support members are further supported by pillion step brackets projecting laterally outwardly from said rear frame sections.

6. In a body frame of a saddle-type vehicle where said body frame includes a head pipe which steerably supports a steering system including a front wheel, a main frame section extending rearwardly downward from said head pipe, and a pair of left and right lower frame sections extending substantially horizontally rearward from a lower portion of said main frame section,
and where a fuel tank is disposed rearwardly of said main frame section with a portion thereof disposed between said left and right lower frame sections, a fuel pump is provided for pumping fuel out of said fuel tank, and a floor panel is disposed above said fuel tank for supporting a driver's feet thereon,
the improvement comprising a fuel tank support structure comprising:
a pair of spaced apart floor support members provided below said floor panel, said floor support members extending laterally outside of said lower frame sections, wherein said floor support members are operatively attached to said fuel tank to provide support thereto, wherein said fuel pump is attached to an upper surface of said fuel tank, and wherein upper edges of said floor support members are located above said fuel pump,
and wherein said lower frame sections are bent in a downwardly projecting shape such that their lower edges have lowest points at a position in the vicinity of said fuel pump.

7. In a body frame of a saddle-type vehicle where said body frame includes a head pipe which steerably supports a steering system including a front wheel, a main frame section extending rearwardly downward from said head pipe, and a pair of left and right lower frame sections extending substantially horizontally rearward from a lower portion of said main frame section,
and where a fuel tank is disposed rearwardly of said main frame section with a portion thereof disposed between said left and right lower frame sections, a fuel pump is provided for pumping fuel out of said fuel tank, and a floor panel is disposed above said fuel tank for supporting a driver's feet thereon,
the improvement comprising a fuel tank support structure comprising:
a pair of spaced apart floor support members provided below said floor panel, said floor support members extending laterally outside of said lower frame sections, wherein said floor support members are operatively attached to said fuel tank to provide support thereto, wherein said fuel pump is attached to the upper surface of said fuel tank, and where upper edges of said floor support members are located above said fuel pump, and wherein said lower frame sections are disposed such that lower edges thereof extend proximate a lower surface of said fuel tank, and said lower edges have their lowest points at a position in the vicinity of said fuel pump and
said support structure further comprising a crossmember extending between said left and right floor support members and disposed above said fuel pump and below said floor panel.

8. The fuel tank support structure of claim 7, wherein a tank stay is provided attached to and extending downwardly from each of said floor support members, respectively, each of said tank stays including a first support section extending downwardly from the corresponding floor panel support member, and a second support section extending inwardly in a vehicle width direction from the first support section, and wherein said fuel tank is supported between said tank stays.

9. The fuel tank support structure of claim 7, wherein the body frame further comprises a pair of rear frame sections extending rearwardly and upwardly from rear end portions of said lower frame sections, and wherein said floor support members are supported at their front end portions by said main frame section and at their rear end portions by said rear frame sections.

10. The fuel tank support structure of claim 9, wherein said rear end portions of said floor support members are further supported by pillion step brackets projecting laterally outwardly from said rear frame sections.

* * * * *